United States Patent
Beers et al.

(10) Patent No.: US 8,330,792 B2
(45) Date of Patent: Dec. 11, 2012

(54) MEASURING LATENCY IN A VIDEO CONFERENCE SYSTEM

(75) Inventors: Ted Beers, Corvallis, OR (US); Jon A. Brewster, Corvallis, OR (US); Donald W. Welch, Corvallis, OR (US); Timothy S. Hubley, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1502 days.

(21) Appl. No.: 11/897,882

(22) Filed: Aug. 31, 2007

(65) Prior Publication Data
US 2009/0058986 A1 Mar. 5, 2009

(51) Int. Cl.
*H04N 7/14* (2006.01)

(52) U.S. Cl. .......... 348/14.08; 348/14.12; 348/14.1

(58) Field of Classification Search .... 348/14.01–14.13; 370/252, 352; 709/224; 379/27.01, 900
See application file for complete search history.

(56) References Cited

U.S. PATENT DOCUMENTS

| | | | |
|---|---|---|---|
| 7,113,485 B2 | 9/2006 | Bruckman | |
| 2005/0027857 A1* | 2/2005 | McPherson et al. | 709/224 |
| 2005/0208979 A1* | 9/2005 | Kim | 455/566 |
| 2006/0204226 A1 | 9/2006 | Park et al. | |
| 2006/0215975 A1* | 9/2006 | Kim et al. | 385/123 |
| 2008/0056154 A1* | 3/2008 | Firestone et al. | 370/252 |

FOREIGN PATENT DOCUMENTS

| | | |
|---|---|---|
| JP | 04-371043 | 12/1992 |
| KR | 10-2005-0094218 | 9/2005 |
| KR | 10-2006-0102127 | 9/2006 |

* cited by examiner

*Primary Examiner* — Melur Ramakrishnaiah

(57) ABSTRACT

A method of measuring video latency between a sender and a receiver in a video conference system is disclosed. In an embodiment, the method includes initiating an electrical signal from a first location in a video conference system, transmitting the electrical signal through the video components of the video conference system, reflecting the electrical signal back through the video components of the video conference system and measuring the latency of the electrical signal at the first location related to the transmission and reflection of the electrical signal.

18 Claims, 6 Drawing Sheets

Initiating an electrical signal from a first location in a video conference system.
101

Transmitting the electrical signal through the video components of the video conference system.
102

Reflecting the electrical signal back through the video components of the video conference system.
103

Measuring the latency at the first location related to the transmission and reflection of the electrical signal.
104

FIG. 1

MEASURING LATENCY IN A VIDEO CONFERENCE SYSTEM

BACKGROUND

In a video conference environment for performing an electronic conference through a communication network, a video conference system is provided in each of locations in which participants of a conference come together and a plurality of such video conference systems communicate via the communication network. Each video conference system collects image information and audio information in a location in which the conference system is provided. The image information and the audio information are synthesized and the synthesized information is distributed to the respective conference systems. In each conference system, the image information is displayed on a display device provided in the video conference system and the audio information is outputted through a loudspeaker also provided in the video conference system.

In order for the video conference to be conducted successfully, it is important to be able to measure the latency of the video conference components. A conventional methodology involves the use of ICMP "ping" messages. However, this methodology only yields network latency and doesn't take into account the latency of the video components in the video conference pipeline.

BRIEF DESCRIPTION OF THE DRAWINGS

FIG. 1 is a high-level flowchart of a method in accordance with an embodiment.

DETAILED DESCRIPTION

Figure 2:
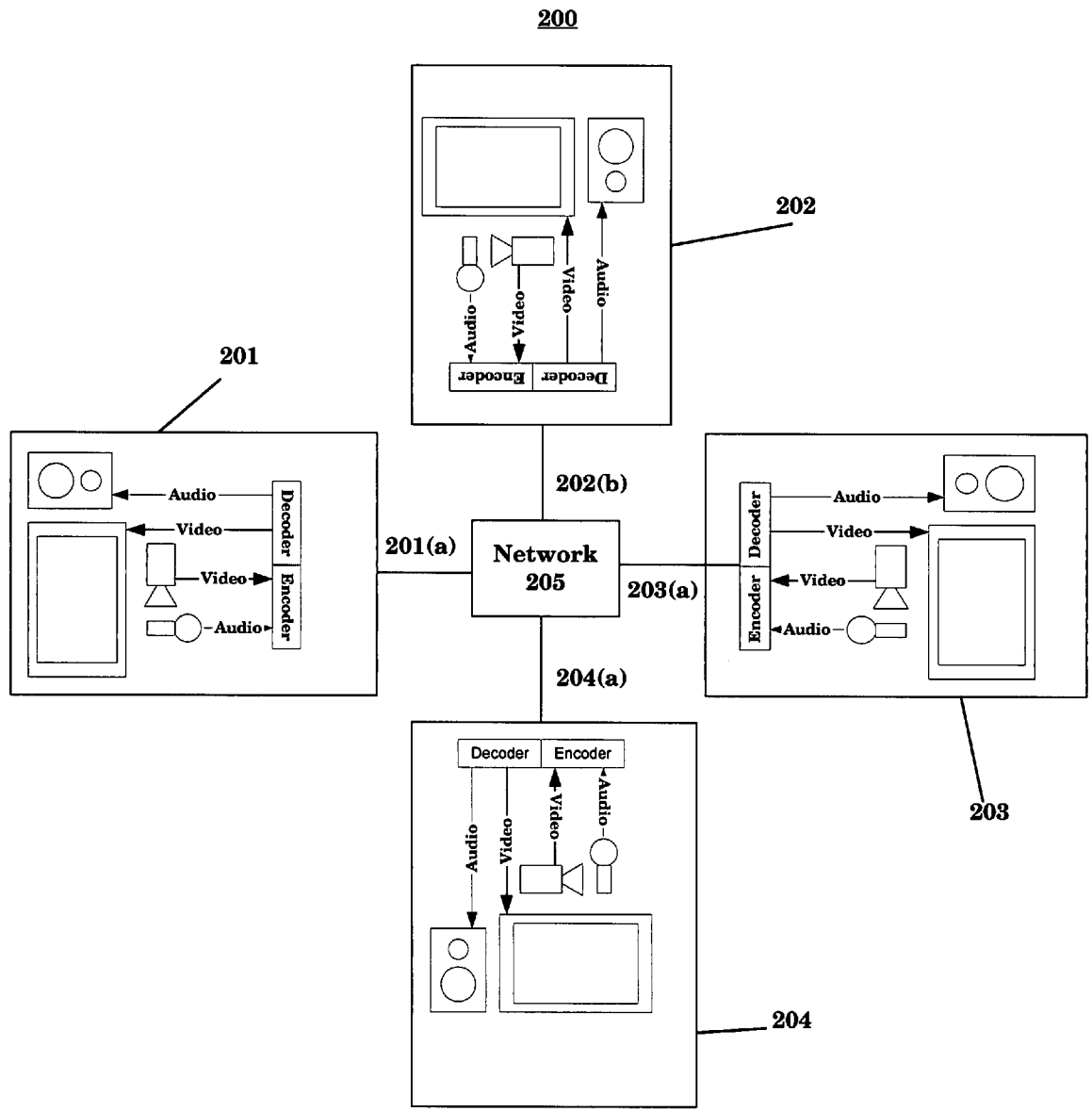
FIG. 2 is an exemplary video conference environment in accordance with an embodiment.

As shown in the drawings for purposes of illustration, a method of measuring video latency between a sender and a receiver in a video conference system is disclosed. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiment shown but is to be accorded the widest scope consistent with the principles and features described herein.

In an embodiment, the measurement of the latency associated with video components can be measured across geographical locations by measuring the start of an electrical signal and the return of the electrical signal at the same physical location. By reflecting the original electrical signal back into the pipeline of video components and sensing the signal at the point of origin, the one-way networked video latency can by calculated to be ½ of the round trip time (RTT) latency. Consequently, the end-to-end latency contribution of all of the system components in a video pipeline can be measured repeatedly and reliably.

FIG. 1 is a flowchart of a method in accordance with an embodiment. A first step 101 involves initiating an electrical signal from a first location in a video conference system. A next step 102 includes transmitting the electrical signal through the video components of the video conference system. A next step 103 includes reflecting the electrical signal back through the video components of the video conference system. A final step 104 includes measuring the latency of the electrical signal at the first location related to the transmission and reflection of the electrical signal. Again, by implementing this automated feature, the end-to-end latency contribution of all of the system components in a video pipeline can be measured repeatedly and reliably.

Referring to FIG. 2, an exemplary video conference environment 200 is illustrated. In an embodiment, the telepresence system is the HALO system implemented by Hewlett-Packard. The environment 200 includes multiple video conference systems 201-204 associated with multiple sites of the video conference. The respective video conference systems 201-204 are located in different points in the environment 200 and send image and voice data of a video conference through the bi-directional digital transmission paths 201(a)-204(a) and simultaneously receive image and voice data of other video conference systems and display the images and output the voices thereof via network 205.

In an embodiment, the network 205 is a system that transmits any combination of voice, video and/or data between users. A network typically includes a network operating system, one or more computer systems, the cables connecting them and all supporting hardware and software in between such as bridges, routers and switches. The network operating system manages the different aspects of the network and makes it possible for the network components to transmit data therebetween.

Figure 3:
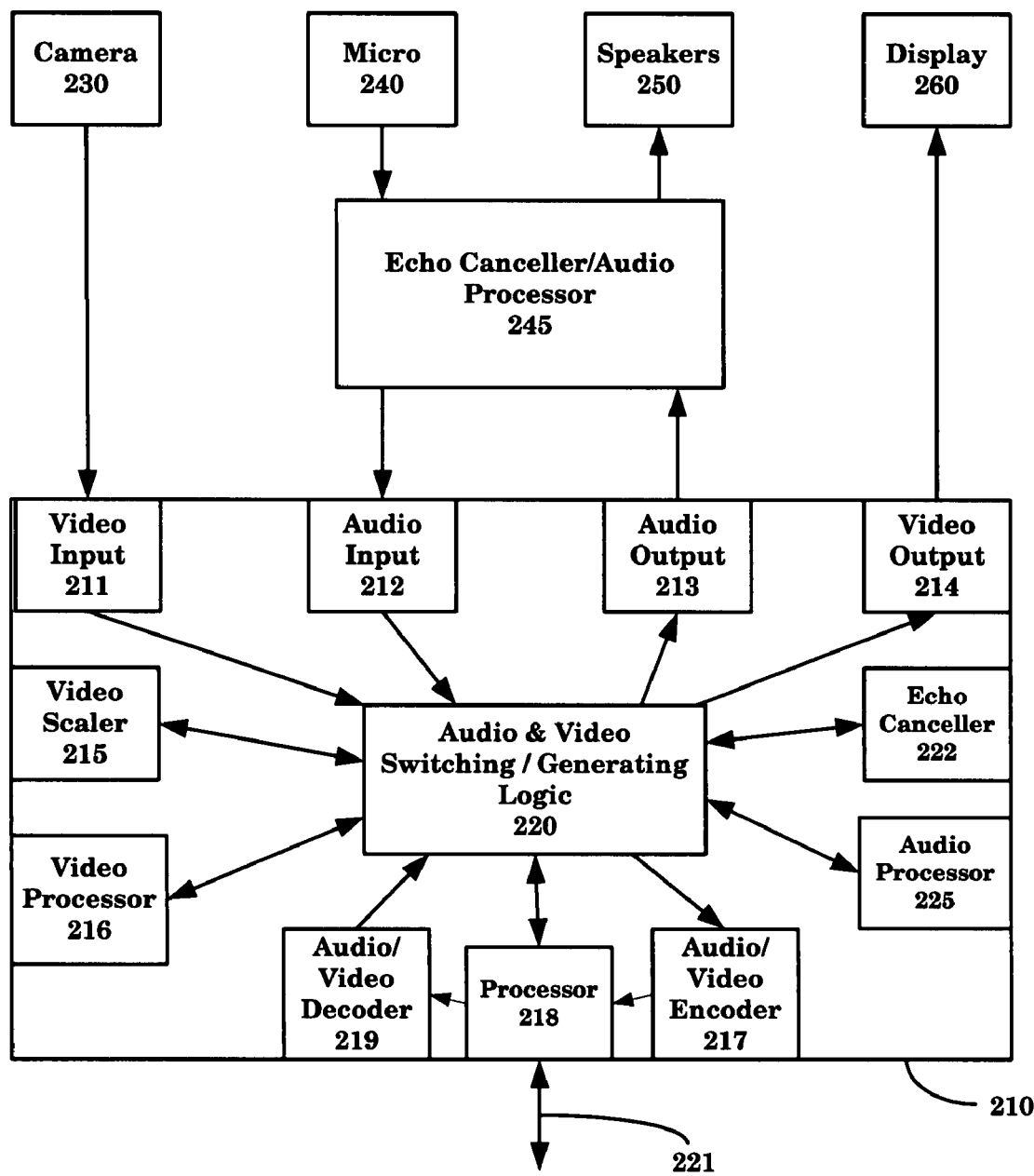
FIG. 3 is a block diagram showing a construction of an exemplary video conference system of the video conference environment in accordance with an embodiment.

FIG. 3 is a block diagram showing a construction of video conference system 201 of the video conference environment 200. Since the other video conference systems have the same construction as that of the video conference system 201, respectively, only the video conference system 201 need be described.

The video conference system 201 includes an audio/video (A/V) system 210. The A/V system 210 includes a video input 211, an audio input 212, an audio output 213 and a video output 214. The configuration 210 also includes a video scaler 215, a video processor 216, an A/V encoder 217, processor 218, A/V decoder 219 and an A/V switching and generating logic 220 wherein the A/V switching and generating logic 220 is coupled to an audio echo canceller 222 and an audio processor 225. Bi-directional digital transmission path 221 is configured for transmitting and receiving A/V data over the network 205.

The A/V system 210 is configured to communicate with a video camera 230 for input of the image of the participant, a microphone 240, a loud-speaker 250 for output of voices of other video conference participant(s) and a for input of a voice of a participant of the video conference and a display 260 for output of the image of another participant(s) of the video conference. The A/V system 210 is also configured to communicate with an audio processing component 245. The audio processing component 245 includes an audio processor and an echo canceller.

To send audio and video data over a network or to store it on a storage medium, the data is "encoded" or "compressed" since the "raw" or "uncompressed" audio/video data is too large to be feasibly transmitted over the network or store onto a storage medium. Encoding audio/video data significantly reduces the size of the data without significantly affecting the quality of the video. Decoding audio/video data involves "decompressing" the encoded data and thereby converting it into data that can be viewed or processed.

Video conferencing data is created by the video camera 230 and the microphone 240 whereby the microphone 240 creates audio data and the video camera create video data. When this data is encoded and transmitted it is referred to as a "stream". Usually audio and video streams are combined into one stream herein referred to as an A/V stream.

The A/V switching and generating logic 220 is configured for multiplexing and processing video signals received from video camera 230 via the video input 211 and audio signals received from the microphone 240 via the audio input 212. Additionally, the A/V switching and generating logic 220 transmits decoded A/V signals received from the A/V decoder 219 to the speaker 250 and the display 260 respectively via audio output 213 and video output 214.

In an embodiment, the A/V stream is generated from the camera 230 and the microphone 240, respectively. This stream is multiplexed by the A/V switching and generating logic 220 and transmitted to the A/V encoder 217. The encoded A/V data is then transmitted to other video conference participants via the bi-directional digital transmission path 221.

Although the system 201 is described in conjunction with above-delineated components, it should be noted that the system 201 is an exemplary system. One of ordinary skill in the art will readily recognize that a variety of different components could be employed while remaining within the spirit and scope of the inventive concepts. For example, the A/V system 210 is illustrated as a stand alone hardware unit, however the A/V system 210 could be implemented as functional software blocks within a personal computer (PC) system.

In an embodiment, a latency measurement sequence can be initialized between various components in the A/V system to assess a time measurement between the audio and video signals. Some components within the A/V system 210 process only audio signals, some process only video signals while others process A/V signals. Accordingly, time delays associated with these signals can be measured by testing the components that employ the respective audio, video and A/V signals.

Figure 4:
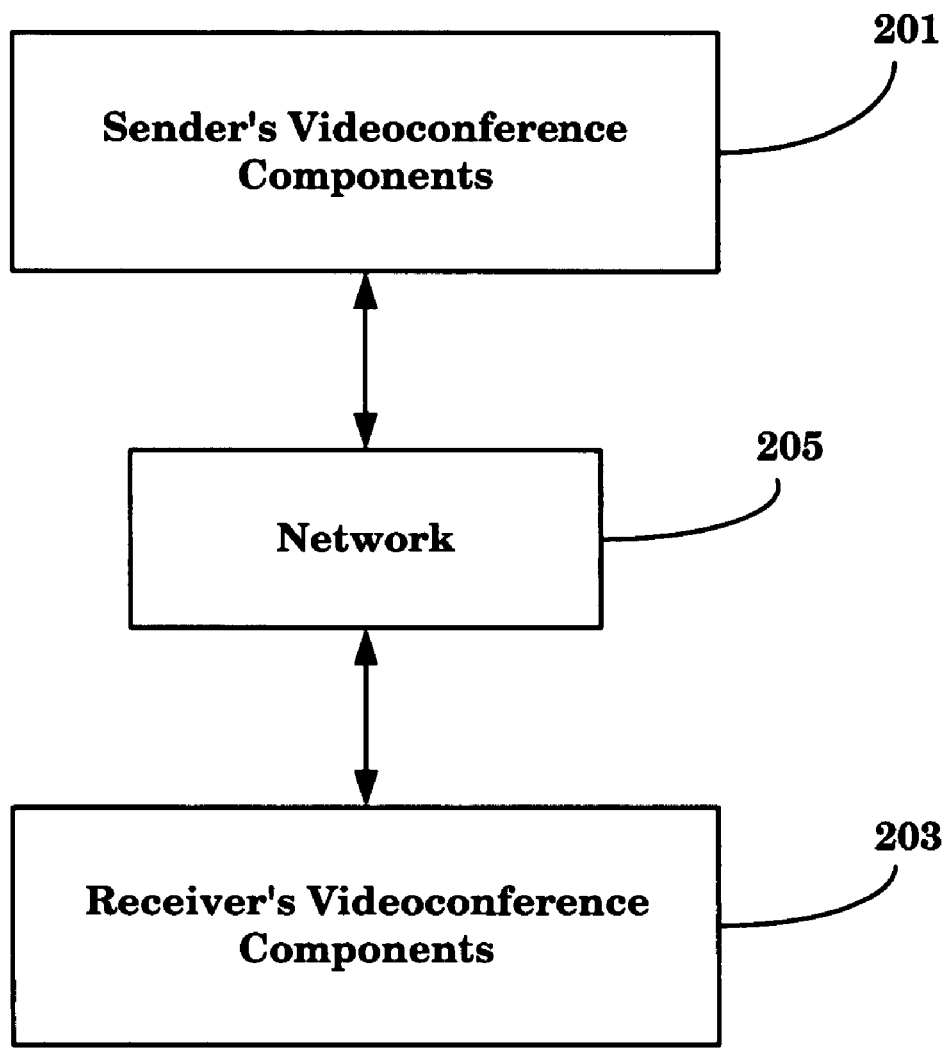
FIG. 4 is a high-level illustration of a latency measurement embodiment.

The video signal latency measurement sequence can be initiated by an automated or manual stimulus. FIG. 4 is a high-level illustration of an embodiment. FIG. 4 shows a sending video conference unit 201, a network 205 and a receiving video conference unit 203. In an embodiment, a latency measurement sequence between the sending and receiving video conference units 201, 203 is initiated in order to measure the latency of the video component pipeline. This measurement can be performed in order to check the system performance or for a variety of other reasons.

Figure 5:
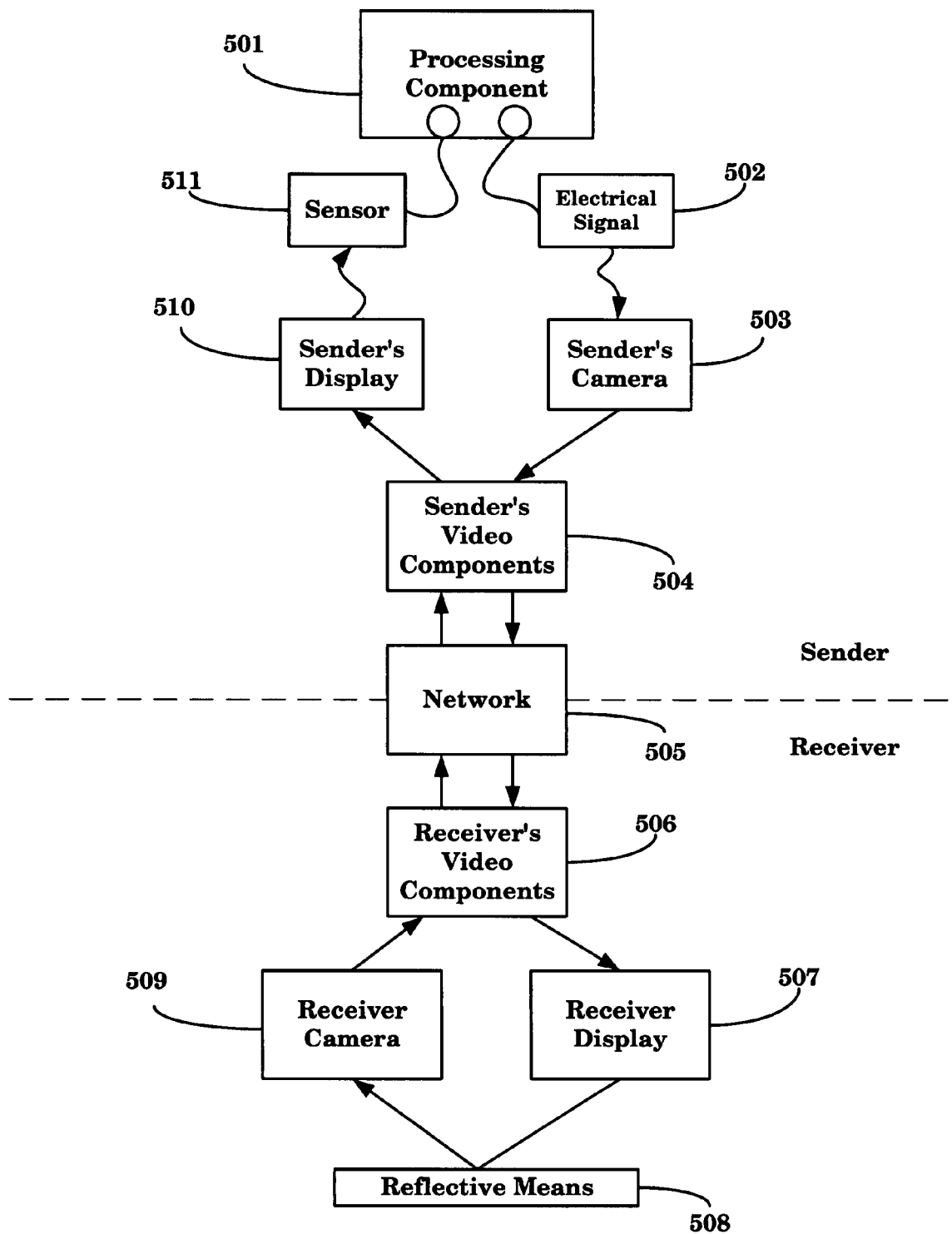
FIG. 5 shows an illustration of a system in accordance with an embodiment.

To measure the latency of the video conference components, other system components are incorporated to facilitate this measurement. FIG. 5 shows an illustration in accordance with an embodiment. As can be seen in FIG. 5, a sender's side and a receiver side of the configuration is shown. FIG. 5 shows a processing component 501 coupled to an electrical signal generator 502. In an embodiment, the electrical signal is a light pulse and the processing component 501 includes a field programmable gate array (FPGA) and a liquid crystal display (LCD) for displaying the results of the latency measurement. Once this light pulse is sent, a timer in the processing component 501 is started. This light pulse is captured by the sender's camera 503. The sender's camera 503 transmits this light pulse to the sender's video components 504. The light pulse is then transmitted to the receiver video components 506 through the network 505.

The light pulse is then transmitted from the receiver video components 506 to the receiver's display 507. A reflective means 508 is employed to direct the light pulse from the receiver's display 507 to the receiver's camera 509. The reflective means 508 could be an optical fiber component or some type of mirror. The receiver's camera 509 then transmits the light pulse to the sender's video components 504 through the receiver video components 506 and the network 505.

The light pulse is then sent from the sender's video components 504 to the sender's video display 510. A sensor 511 then senses the light pulse from the display 510. Once the sensor 511 senses the light pulse, the processing component 501 stops the timer and records the latency measurement. This is the RTT latency. Consequently, the one-way networked video latency can by calculated to be ½ of the RTT latency.

Figure 6:
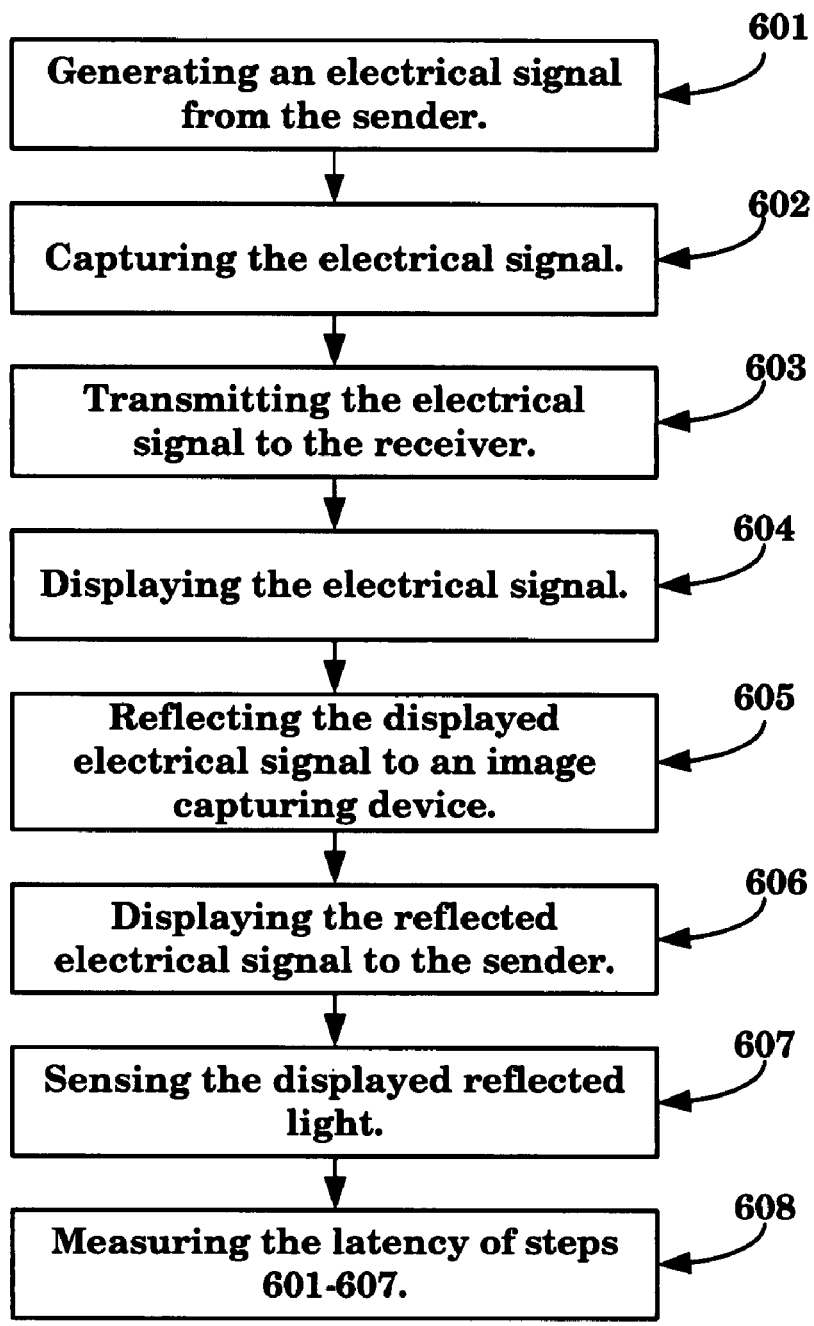
FIG. 6 is a flowchart of a method in accordance with an alternate embodiment.

FIG. 6 is a flowchart of a method in accordance with above-disclosed embodiment. A first step 601 involves generating an electrical signal from the sender. In an embodiment, the video conferencing system includes a sender and a receiver and the electrical signal is a light pulse wherein the light pulse could be a blinking light having a frequency less than the measured latency. A second step 602 involves capturing the electrical signal. A third step 603 includes transmitting the electrical signal to the receiver. A next step 604 includes displaying the electrical signal.

A next step 605 includes reflecting the displayed electrical signal to an image capturing device. In an embodiment, a reflection means is incorporated to reflect the displayed electrical signal. A next step 606 includes displaying the reflected electrical signal to the sender. A next step 607 involves sensing the displayed reflected light. A final step 608 includes measuring the latency of steps 601-607. Again, by implementing this feature, the end-to-end latency contribution of all of the system components in a video pipeline can be measured repeatedly and reliably.

A method of measuring video latency between a sender and a receiver in a video conference system. In an embodiment, the method includes initiating an electrical signal from a first location in a video conference system, transmitting the electrical signal through the video components of the video conference system, reflecting the electrical signal back through the video components of the video conference system and measuring the latency of the electrical signal at the first location related to the transmission and reflection of the electrical signal. Through the implementation of the above-described methodology, the measurement of the latency associated with video components can be measured across geographical locations by measuring the start of an electrical signal and the return of the electrical signal at the same physical location. By reflecting the original electrical signal back into the pipeline of video components and sensing the signal at the point of origin, the one-way networked video latency can by calculated to be ½ of the round trip time (RTT) latency. Consequently, the end-to-end latency contribution of all of the system components in a video pipeline can be measured repeatedly and reliably.

The above-described embodiment may also be implemented, for example, by operating a computer system to execute a sequence of computer readable instructions. Accordingly, a computing device typically includes at least some form of computer readable media. Computer readable media can be any available media that can be accessed by computing device. By way of example, and not limitation, computer readable media may comprise computer storage media and communications media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage device, or any other medium which can be used to store the desired information and which can be accessed by computing device.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Accordingly, an alternate embodiment includes a computer readable medium having computer executable components for automatically calibrating a video conferencing system.

Without further analysis, the foregoing so fully reveals the gist of the present inventive concepts that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

The invention claimed is:

1. A method of measuring video latency between a sender and a receiver in a video conference system comprising:
   initiating an electrical signal from a first location in a video conference system;
   transmitting the electrical signal through the video components of the video conference system;
   reflecting the electrical signal back through the video components of the video conference system; and
   measuring the latency of the electrical signal at the first location related to the transmission and reflection of the electrical signal.

2. The method of claim 1 further comprising:
   a) generating an electrical signal from the sender;
   b) capturing the electrical signal;
   c) transmitting the electrical signal to the receiver;
   d) displaying the electrical signal as a light pulse;
   e) reflecting the displayed light pulse to an image capturing device thereby creating a reflected electrical signal;
   f) displaying the reflected electrical signal to the sender;
   g) sensing the displayed reflected electrical signal; and
   h) measuring the latency of steps a-g.

3. The method of claim 2 wherein the light pulse further comprises blinking light having a frequency less than the measured latency.

4. The method of claim 1 wherein the step of reflecting further comprises utilizing a mirror to reflect the electrical signal as a light pulse.

5. The method of claim 1 wherein the step of reflecting further comprises utilizing a fiber optic component to reflect the electrical signal as a light pulse.

6. A non-transitory computer program product for measuring video latency between a sender and a receiver in a video conference system, the computer program product comprising a computer usable medium having computer readable program means for causing a computer to perform the steps of:
   initiating an electrical signal from a first location in a video conference system;
   transmitting the electrical signal through the video components of the video conference system;
   reflecting the electrical signal back through the video components of the video conference system; and
   measuring the latency of the electrical signal at the first location related to the transmission and reflection of the electrical signal.

7. The non-transitory computer program product of claim 6 further comprising:
   a) generating an electrical signal from the sender;
   b) capturing the electrical signal;
   c) transmitting the electrical signal to the receiver;
   d) displaying the electrical signal as a light pulse;
   e) reflecting the displayed light pulse to an image capturing device thereby creating a reflected electrical signal;
   f) displaying the reflected electrical signal to the sender;
   g) sensing the displayed reflected electrical signal; and
   h) measuring the latency of steps a-g.

8. The non-transitory computer program product of claim 6 wherein the light pulse further comprises blinking light having a frequency less than the measured latency.

9. The non-transitory computer program product of claim 6 wherein the step of reflecting further comprises utilizing a minor to reflect the electrical signal as a light pulse.

10. The non-transitory computer program product of claim 6 wherein the step of reflecting further comprises utilizing a fiber optic component to reflect the electrical signal as a light pulse.

11. A video conference system comprising:
   electrical signal generation means for transmitting an electrical signal;
   at least one image capturing means;
   at least one video component coupled to the image capturing means;
   at least one display means coupled to the at least one video component;
   a reflective means for reflecting an electrical signal from the electrical signal generation means;
   a sensing means for sensing the reflected electrical signal; and
   a processor at a first location of in the video conference system coupled to the electrical signal generation means and the sensing means for measuring a latency associated with the transmission of the electrical signal from the first location and the sensing of the electrical signal at the first location.

12. The system of claim 11 wherein the at least one video component comprises sender's video components and receiver's video components.

13. The system of claim 11 wherein the reflective means further comprises an optical fiber component.

14. The system of claim 11 wherein the reflective means further comprises a mirror.

15. The system of claim 11 wherein the electrical signal comprises a light pulse.

16. A video component latency measurement apparatus comprising:
- electrical signal generation means for transmitting an electrical signal;
- a sensing means for sensing a reflected electrical signal; and
- a processing component comprising a field programmable gate array and a liquid crystal display for displaying the results of the latency measurement, the processing component coupled to the electrical signal generation means and the sensing means for measuring a latency associated with the transmission of the electrical signal from a first location and the sensing of the electrical signal at the first location.

17. The apparatus of claim 16 wherein the electrical signal comprises a light pulse.

18. The apparatus of claim 17 wherein the light pulse further comprises blinking light having a frequency less than the measured latency.

* * * * *